United States Patent [19]

Pullukat et al.

[11] 4,284,527

[45] Aug. 18, 1981

[54] POLYMERIZATION CATALYST

[75] Inventors: Thomas J. Pullukat, Hoffman Estates; Mitsuzo Shida, Barrington, both of Ill.

[73] Assignee: Chemplex Company, Rolling Meadows, Ill.

[21] Appl. No.: 87,702

[22] Filed: Oct. 24, 1979

Related U.S. Application Data

[63] Continuation-in-part of Ser. No. 916,807, Jun. 19, 1978.

[51] Int. Cl.$^3$ ................................................ C08F 3/04
[52] U.S. Cl. .................................. 252/430; 252/431 R; 252/431 C; 252/432; 252/467; 252/469
[58] Field of Search ............... 252/430, 431 R, 431 C, 252/432, 467, 469

[56] References Cited

U.S. PATENT DOCUMENTS

| | | | |
|---|---|---|---|
| 2,734,874 | 2/1956 | Drake et al. | 252/461 |
| 2,863,891 | 12/1958 | Granchelli | 260/429 |
| 3,349,067 | 10/1967 | Hill | 526/106 X |
| 3,474,080 | 10/1969 | Rekers | 252/430 X |
| 3,484,428 | 12/1968 | Kallenbach | 260/94.9 |
| 3,541,072 | 11/1970 | Witt et al. | 252/430 X |
| 3,752,795 | 8/1973 | Boone | 252/430 X |
| 3,759,918 | 9/1973 | Yamaguchi et al. | 260/80.7 |
| 3,780,011 | 12/1973 | Pullukat | 260/430 X |
| 3,806,500 | 4/1974 | Karol | 260/94.9 B |
| 3,844,975 | 10/1974 | Karol | 252/430 |
| 3,875,132 | 4/1975 | Kruse | 252/430 X |
| 3,879,362 | 4/1975 | Chalfont | 252/431 R |
| 3,953,413 | 4/1976 | Hwang | 252/430 X |
| 3,970,613 | 7/1976 | Goldie et al. | 526/104 |
| 3,986,983 | 10/1976 | Hoff | 252/428 |
| 4,016,343 | 4/1977 | Hoff et al. | 252/431 R |
| 4,041,224 | 8/1977 | Hoff et al. | 252/430 X |
| 4,053,437 | 10/1977 | Liu et al. | 252/458 |

*Primary Examiner*—John F. Niebling
*Attorney, Agent, or Firm*—Wegner, Stellman, McCord, Wood & Dalton

[57] ABSTRACT

A new catalyst and a method of polymerizing olefins in which the catalyst is prepared (1) by forming a mixture by dispersing on a finely divided, difficult to reduce, inorganic support of silica, alumina, thoria, zirconia, titania, magnesia or mixtures of these a tetravalent or lower valent organic chromium compound, (2) calcining the mixture of (1) in an oxidizing or inert atmosphere and at an elevated temperature to produce a chromium compound on the support, (3) reacting the product of (2) with an alkyl ester of titanium, boron, vanadium or mixtures thereof at an elevated temperature, and (4) activating the product of (3) with a dry gas that contains oxygen by heating at an elevated temperature the product of (3) in this dry gas.

10 Claims, No Drawings

POLYMERIZATION CATALYST

CROSS-REFERENCE TO RELATED APPLICATION

This application is a continuation-in-part of our co-pending application Ser. No. 916,807, filed June 19, 1978.

BACKGROUND OF THE INVENTION

This invention relates to a new catalyst made by modification of the methods described in Pullukat et al U.S. Pat. No. 3,780,011 and Hoff et al U.S. Pat. No. 4,041,224, both assigned to the assignee hereof. The present invention differs from these primarily by using an organic chromium compound as a chromium source with the requirement being that the chromium compound is capable of reacting with the support at an elevated temperature to produce a chromium compound chemically bound to the support followed by reacting this product at an elevated temperature with a titanium, boron, vanadium or mixed alkyl ester and then activating this product with a dry gas that contains oxygen by heating at an elevated temperature.

SUMMARY OF THE INVENTION

This invention avoids the handling of any substantial amount of hexavalent chromium oxide in the catalyst preparation and is a very important feature of the invention because regulations have been proposed banning the use of such hexavalent chromium as being a carcinogen. This was made possible by the discovery that certain organochromium compounds if fixed on the support by calcination can react with the esters of boron, titanium and vanadium at an elevated temperature and form catalysts that are useful in olefin polymerization. The polymers made using these catalysts have higher melt index than polymers made with conventional catalysts. Using combinations of boron and titanium, it is possible to tailor the molecular weight distribution of the polymer made using the catalysts of this invention. The hydrogen sensitivity for melt index control and alpha-olefin incorporation efficiency for density control in polymerization with these catalysts is exceptional.

Although it has been proposed in the past to form chromium supported catalysts of the type disclosed herein by calcining the mixture of chromium acetylacetonate, which is customarily written as Cr(AcAc)$_3$ (this is disclosed, for example, in prior U.S. Pat. No. 2,734,874), the present invention goes beyond this to produce a superior catalyst by reacting the calcined product with an alkyl ester, with 1–6 carbon atoms in each alkyl group, if titanium, boron, vanadium or mixtures of these at an elevated temperature followed by activating with a dry gas that contains oxygen. Disclosures similar to that of the above U.S. Pat. No. 2,734,874 also are presented in U.S. Pat. Nos. 3,349,067; 3,484,428; 3,541,072; 3,759,918 and 3,970,613.

DESCRIPTION OF THE PREFERRED EMBODIMENT

In preparing the catalyst of this invention a catalyst support which may be either silica, alumina, thoria, zirconia, titania, magnesia or mixtures of two or more of these is mixed with an organic chromium compound and this mixture is dried preferably by fluidizing using dry nitrogen or dry air at a drying temperature. Then this mixture is calcined in an air or inert atmosphere and at an elevated temperature to bond the chromium compound to the support. This is followed by reacting this product with an alkyl ester of titanium, boron, vanadium or mixtures of these at an elevated temperature followed by activating with a dry gas that contains oxygen by heating at an elevated temperature in the presence of the gas.

The calcination time and temperature are selected to be sufficient to bond the chromium compound to the support with complete or partial decomposition of the organic group but without oxidation to hexavalent chromium oxide. In general, 80°–260° C. for 15 minutes to 4 hours or longer is preferred while in most cases 130°–260° C. is ideal. This calcination is preferably done in a fluid bed and air or nitrogen can be used as the fluidizing gas.

The amount of organic chromium compound used is sufficient to introduce about 0.1–10 wt.% chromium into the catalyst based on the weight of the catalyst. The catalyst composition containing 1 wt.% chromium is highly active and consequently there is ordinarily no reason to use a larger percentage.

Although the following discussion relates to titanium compounds, similar boron or vanadium compounds or mixtures of two or more of titanium, boron or vanadium as alkyl esters may be used if desired.

The titanium compound may be selected from the following formulas:

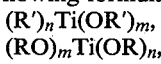

titanium acetyl acetonate compounds,
alkanolamine titanates in which m is 1, 2, 3 or 4, n is 0, 1, 2 or 3 and m plus n equals 4; and R is selected from alkyl aryl, cycloalkyl and alkaryl, each group having 1 to 12 carbon atoms; R' is selected from the group consisting of R, cyclopentadienyl and alkenyl, for example ethenyl, propenyl and isopropenyl, each group having 1 to 12 carbon atoms. When more than one R (or R') group occurs in the titanium compound, the group can be the same or different. Titanium compounds represented by the formula (RO)$_4$Ti are preferred, particularly the alkyl compounds having from 1 to 6 carbon atoms in each alkyl group, for example tetraethyl titanate and tetraisopropyl-titanate. The titanium acetyl acetonate compound can be, for example, titanium diacetylacetonate diisopropylate, or the so-called "titanium acetyl acetonate", "titanyl acetyl acetonate". The alkanolamine titanate can be, for example, triethanolamine titanate. In the case of boron compounds, boric acid can also be used.

The quantity of titanium compound used in the process of the present invention is suitably in the range of 0.1–8.0% based on the weight of the support material, and preferably in the range of 1.0–6.0%. Evidence indicates that upon addition of the titanium compound a reaction occurs between the chromium compound and the titanium compound. It is believed that at these elevated temperatures the reactions which occur involve every chromium atom in at least one bond to a titanium atom through an oxide bridge:

In the case of boron and vanadium compounds, as little as 0.1% metal has a great effect on the catalysts. In mixed catalyst systems of boron and titanium 0.3–0.6% boron and 0.5–3% titanium is a preferred combination.

Suitably, the titanium, boron or vanadium compounds are mixed in the absence of moisture with the support and chromium compound. This may be achieved in any convenient manner, for example, by dry mixing, by ball milling, or by incorporating the ester compound as a solid, liquid or vapor into a fluidized bed of the support material, for example, by passing the vapor of the titanium compound into the fluidizing gas. It is preferred that solvents which may interfere in the reaction of chromium with the titanium, boron and vanadium compounds be avoided.

Boron or vanadium compounds similar to the above titanium compounds may be used. Boric acid is a useful compound.

The organochromium compound of this invention can be any compound where the chromium is tetravalent or lower (4-0) and which can react with the support. Examples are $Cr(AcAc)_3$, chromium 2-ethylhexanoate, chromium acetate, etc. The calcination of the chromium-silica combination (0.1-10% chromium) is done at an elevated temperature in nitrogen or air. For practical reasons the lowest possible temperature is desired. Different chromium compounds can require different calcination temperatures. Approximately 80°-260° C. is a convenient range. This calcination is preferably done in a fluidized bed in nitrogen or air.

After the calcination step the calcined material is believed to be a dry intimate mixture of a chromium compound and silica. It need not be a simple mechanical mixture and chemical bonding or fusion may occur. It does not contain $Cr^{+6}$. At this stage the calcined material is treated with vapors of an ester of boron, titanium or vanadium and combinations of these esters at an elevated temperature below the thermal decomposition temperature of the particular ester under use. In the case of boric acid the solid is introduced into the dry mixture. It has been found that a reaction between the chromium compound and the ester compound occurs at this stage. It is believed that Cr—O—Ti, Cr—O—B or Cr—O—V structures or combinations are formed.

The material is inactive as a polymerization catalyst at this stage. This combination is further activated in air at a higher temperature. The activation temperature can be as high as 1000° C. The activated catalyst is used in ethylene polymerization in a particle form, solution form or gas phase process. These catalysts are exceptionally useful in gas phase or slurry processes. They are highly active and show no induction time in polymerization. It is believed that the catalysts of this invention contain novel chromium-titanium, chromium-boron or chromium-vanadium structures after the final air activation. Examples to illustrate this invention are given later in this application.

The organic chromium compounds used to prepare the catalysts which are the subject of this invention include the chromium chelates of Hwang et al U.S. Pat. No. 3,953,413, also assigned to the assignee hereof. The chelates are derived from one or more beta-dicarbonyl compounds that may be either acyclic or cyclic, the chelates being essentially of the formula of the class consisting of

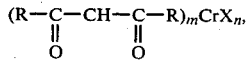

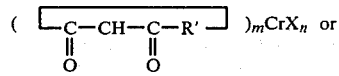

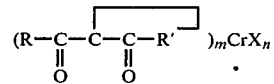

wherein R is individually selected from hydrogen, alkyl, alkenyl, aryl, cycloalkyl and cycloalkenyl radicals and combinations of these radicals with each R containing 0-20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1-20 carbon atoms and a corresponding valence-satisfying number of hydrogen atoms, m is a whole number of 1 to 3, n is a whole number of 0 to 2 and m plus n is 2 or 3 and X is an inorganic or organic negative group (relative to chromium) such as halide, alkyl, alkoxy, and the like. Typical compounds are chromium acetylacetonate, chromium benzoylacetonate, chromium 5,5dimethyl-1,3-cyclohexanedionate, chromium 2-acetylcyclohexanoate, and the like.

A second group of organic chromium compounds are the pi-bonded organochromium compounds of the structure

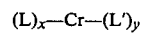

disclosed, for example, in U.S. Pat. Nos. 3,806,500 and 3,844,975 wherein L and L' are the same or different organic ligands which are adapted to being pi-bonded to the chromium atom, and x and y are each integers of 0 to 3, inclusive, and x plus y equals 2 to 6, inclusive. Typical compounds of this group are bis(cyclopentadienyl)chromium(II), bis(benzene)chromium(0), cyclopentadienyl chromium tricarbonyl hydride, etc.

A third group of organic chromium compounds are tetravalent organochromium compounds of the structure $Y_4Cr$ or $(YO)_4Cr$ disclosed, for example, in U.S. Pat. Nos. 3,875,132 and 4,016,343, wherein Y is individually selected from alkyl, alkenyl, cycloalkyl, cycloalkenyl, cycloalkyl-substituted alkyl, or aryl-substituted alkyl radicals containing 1 to about 14 carbon atoms and the tetravalent chromium atom is directly linked to one of the carbon atoms in each alkyl group or to oxygen. Typical compounds of this group are tetrakis(neopentyl)chromium(IV), tetrakis(tertiarybutyl)chromium(IV), tetrakis(t-butoxy)chromium(IV), etc.

Another type of organic chromium compound which may be used in this invention is the reaction product of ammonium chromate and pinacol as disclosed in Hoff et al U.S. Pat. No. 3,986,983, also assigned to the assignee hereof.

Still another group is the well known chromium carboxylates exemplified by chromium acetate.

The support can be any finely divided and difficult to reduce inorganic support and is preferably silica, alumina, zirconia, thoria, magnesia, titania, or mixtures or composites thereof. These supports can have a pore volume in excess of 0.5 cc/g and a surface area ranging from a few m²/g to over 700 m²/g, but preferably above 150 m²/g. A finely divided non-porous support with a high surface area such as "Cab—O—Sil" may also be used.

It is sometimes advantageous to pretreat the support before addition of the organic chromium compound. Such pretreatment typically consists of adjusting the moisture content of the support by drying at elevated temperature or chemically modifying the support. Chemical modification can include adding compounds such as ammonium hexafluorosilicate which can react with the support or with the organic chromium compound during calcining and activation. Chemical modification using metal alkyls which react with the support can also be used.

The organic chromium compound can be deposited on the support prior to calcination in a number of ways well known in the art. These include dry mixing the support and the organic compound, dissolving the chromium compound and mixing the solution and the support, and vaporizing the compound and contacting the vapor with the support. In the case of solution impregnation, it is often convenient to remove excess solvent by drying before proceeding with oxidation.

The new and improved catalysts prepared according to this invention may be used to polymerize 1-olefins, particularly those of 2–8 carbon atoms and copolymerize these with 1-olefins of 2–20 carbon atoms in liquid phase or vapor phase processes to make 0.920–0.96+ density polymer. These processes may be either batch or continuous. The mode of charging catalyst, olefin, and solvent if required, to the reactor system may follow any conventional practice applicable to batch or continuous operation. Normally, agitation is provided in the reactor as well as a means to control the reactor temperature. In liquid phase processes, olefin polymer is normally recovered by flashing off solvent without any intervening steps for removal of the catalyst. The activity of the catalysts described in this invention is high so that catalyst removal for practical purposes is unnecessary. Reactor conditions are dependent on the type of olefin as well as the desired polymer properties. In the case of ethylene, reactor pressures may range from 50 to 1000 psig, temperatures from 65°–260° C. and solids levels from 5–60% by weight.

EXAMPLES 1–3

A composition was prepared by dry blending chromium acetylacetonate and silica (Davison Chemical 952 Grade) to give 1% chromium on the final activated catalyst. The Cr(AcAc)$_3$-silica composition was heated in a fluidized bed at 100°–150° C. in an air flow for about one hour. Different catalysts were made by calcining the Cr(AcAc)$_3$-silica at different temperatures for 1.5–2 hours. They did not contain any hexavalent chromium oxide as determined by calorimetric method. The calcined material was cooled to 150°–175° C. and treated with titanium tetraisopropylate to give 3.5% titanium on the catalyst. The chemical reaction occurring between chromium and titanium ester was indicated by a color change to grey. The chromium-titanium-silica composition was activated at 800° C. in air to impart polymerization activity.

These catalysts were used in ethylene polymerization. The reaction temperature was 105° C. and total pressure was 550 psig. Isobutane was used as a diluent. The results are shown below.

| Exam. No. | Calcination Temp. °C. | Reactivity g/g cat/hr | Polymer Properties | | |
|---|---|---|---|---|---|
| | | | MI | $R_D$ | $S_W$ |
| 1 | 260 | 2777 | .30 | 7.9 | 3.7 |
| 2 | 230 | 3132 | .20 | 7.9 | 3.5 |
| 3 | 130 | 3670 | .23 | 6.8 | 3.6 |

In these examples, MI was measured according to ASTM-D-1238 at 2 kg load. $R_D$ and $S_W$ are rheological measurements on the polyethylene as disclosed in Polymer Eng. and Science, Vol. II, No. 2, page 124, March 1971.

EXAMPLE 4

Davison Grade 952 silica was dried at 130° C. It was impregnated with a CH$_2$Cl$_2$ solution of Cr(AcAc)$_3$ to give 1% chromium on the base. The solvent was evaporated off. The dry material was placed in a fluidized bed and heated in nitrogen at 130° C. It was treated with titanium isopropylate to give 3.5% titanium on the final catalyst. The titanium ester treated material was activated at 805° C. Ethylene polymerization with this catalyst gave a reactivity of 3508 g/g cat/hr. The melt index of the polyethylene was 0.50.

EXAMPLE 5

Davison 952 silica was dried at 150° C. in a fluidized bed. It was treated with 1.25 cc of tetraisopropyltitanate to give 2.5% titanium. Cr(AcAc)$_3$ powder was added to give 1% chromium. This mixture was heated in air at 795° C. This catalyst was used in ethylene polymerization and showed a reactivity of 3288 g/g cat/hr. The melt index of the polyethylene was 0.70, $R_D$ was 7.6 and $S_W$ was 3.9.

EXAMPLE 6

8 grams of silica containing chromium acetylacetonate to give 0.5% chromium on the support was heated at 140° C. for 50 minutes in a fluidized bed using a current of air. It was treated with 1.75 cc of tetraisopropyl titanate to give 3.5% titanium on the catalyst. The resulting product was activated in air at 820° C. for five hours. This catalyst was used in ethylene-butene-1 copolymerization. The reaction temperature was 93° C. The polymer had a density of 0.934, MI of 0.57 and $R_D$ of 7.8.

EXAMPLE 7

A catalyst similar to Example 6 was made except it contained 2% titanium, 0.5% chromium and 0.75% boron. A copolymerization at 93° C. using this catalyst gave a polymer with a density of 0.929, MI of 0.86 and $R_D$ of 7.1. This example shows that the presence of titanium gave higher $R_D$ than with boron alone.

EXAMPLE 8

8 grams of Davison Grade 952 silica containing 0.5% chromium as Cr(AcAc)$_3$ was heated in a fluid bed activator at 140° C. with an air flow. It was treated with trimethyl borate to give 0.75% boron and then tetraisopropyl titanate to give 2% titanium. The reaction mixture was activated at 805° C. in air. This catalyst was used in ethylene polymerization at 105° C. with 50 psig hydrogen and a total pressure of 550 psig. Isobutane was the diluent. The reactivity of this catalyst was 1563 g/g cat/hr. The polyethylene had an MI of 0.25 and $R_D$ of 5.8.

The same catalyst was also used in an ethylene-butene-1 copolymerization at 93° C. to make a polymer with a density of 0.940. The polymer had an HLMI of 8.7 and $R_D$ of 7.9. These examples show that the presence of titanium in addition to boron gave a polymer with higher shear sensitivity or $R_D$.

EXAMPLE 9

8 grams of a silica—Cr(AcAc)$_3$ (1% chromium) combination was placed in a fluid bed activator and it was heated to 150° C. in a flow of nitrogen for 1.5 hours. It was cooled to 90° C. and 2 cc of tetraisopropyl titanate (4% titanium) was syringed in to the fluid bed. The reaction was allowed to proceed for 0.5 hours. The reaction mixture was activated in air at 750° C. The air was replaced with nitrogen and the catalyst was transferred to a flask. A portion of this catalyst was used in ethylene polymerization at 105° C. as in the above comparative example. The reactivity of the catalyst was 3500 g/g cat/hr. The melt index of the polyethylene was 1.23.

EXAMPLE 10 (Comparative)

A catalyst similar to that disclosed in U.S. Pat. No. 4,041,224 was prepared. The silica-Cr(AcAc)$_3$ (1% chromium) combination was placed in a fluid bed activator and heated to 170° C. in nitrogen. It was cooled to 90° C. and 2 cc of tetraisopropyl titanate (4% titanium) was syringed in to the fluid bed. The material was activated in a 93% nitrogen—7% carbon monoxide mixture at 760° C. for 5 hours. The carbon monoxide flow was shut off and nitrogen flow was continued for one hour. The heat treated material was oxidized by air at 760° C. for 15 minutes and it was cooled in nitrogen. The catalyst was transferred to a flask. A portion of this catalyst was used in ethylene polymerization at 105° C. as in Examples 8 and 9. The reactivity of the catalyst was 2373 g/g cat/hr. The melt index of the polyethylene was 2.65.

EXAMPLE 11 (Comparative)

Another catalyst similar to that disclosed in U.S. Pat. No. 4,041,224 was prepared. In this example the air treatment temperature after the nitrogen-carbon monoxide activation was done at 500° C. instead of 760° C. as in Example 10. Ethylene polymerization using this catalyst under the same conditions as in Example 10 gave polyethylene with an MI of 35.8, also high as compared to the invention.

The purpose of this example is to show that the melt index of this patent is greater than the MI of the example.

EXAMPLE 12 (Comparative)

8 grams of Davison Grade 952 silica and Cr(AcAc)$_3$ (1% chromium) was placed in an activator tube and it was fluidized with nitrogen for 4.5 hours at 24.5° C. 2 cc of tetraisopropyl titanate was added at 24.5° C. to give 4% titanium on the catalyst. After 0.5 hour the nitrogen was replaced with air and the mixture was activated at 720° C. Ethylene polymerization at the same condition as Example 9 gave polyethylene with an MI of only 0.18. This experiment demonstrates the importance of precalcination and temperature of titanium ester reaction on MI.

EXAMPLE 13

8 grams of Davison Grade 952 silica-chromium acetate (1% chromium) combination was similarly heated at 180° C. for 2.5 hours and 1 hour at 80° C. It was treated with trimethyl borate to give 1% boron. The reaction product was activated in air at 590° C. Ethylene polymerization at 108° C. gave a reactivity of 1860 g/g cat/hr. The polyethylene gave an $R_D$ of 3.7.

EXAMPLE 14

8 grams of Davison Grade 952 silica-chromium acetate (1% chromium) combination was heated at 100° C. for 3 hours. It was treated with 0.36 gram of boric acid to give 0.8% boron at 100° C. The reaction mixture was activated in air at 600° C. Ethylene polymerization at 105° C. gave a reactivity of 2467 g/g cat/hr. The melt index of the polyethylene was 0.09.

Having described our invention as related to the embodiments set out herein, it is our intention that the invention be not limited by any of the details of description, unless otherwise specified, but rather be construed broadly within its spirit and scope as set out in the appended claims.

We claim:

1. A catalyst, prepared by the method comprising: preparing (1) a mixture by dispersing on a finely divided, difficult to reduce, inorganic support of the class consisting of silica, alumina, thoria, zirconia, titania, magnesia and mixtures thereof a tetravalent or lower valent organic chromium compound; (2) calcining (1) in air or inert atmosphere and at an elevated temperature of 80°–260° C. to bond the chromium compound on said support; (3) reacting the product of (2) with an alkyl ester of titanium, boron, vanadium or mixtures thereof or boric acid at an elevated temperature; and, immediately after (3) while avoiding any substantial contact with an inert gas, (4) activating the product of (3) with a dry gas that contains oxygen by heating at an elevated temperature said product of (3) in said gas.

2. The catalyst of claim 1 wherein said calcining is done in a dry, inert atmosphere at an elevated temperature of about 80°–260° C.

3. The catalyst of claim 1 wherein said activating is in a fluid bed using an oxidizing gas to maintain the product of (3) in a fluid condition.

4. The catalyst of claim 1 wherein said organic chromium compound comprises a chromium chelate of a betadicarbonyl compound essentially of the formula of the class consisting of

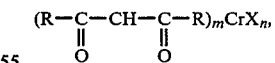

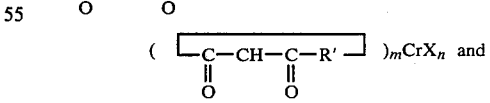

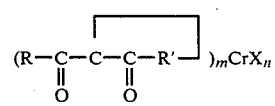

wherein each R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1-20 carbon atoms and a corresponding valence-satisfying number of hydrogen atoms, m is a whole number from 1 to 3, n is a whole number from 0 to 2 with m plus n being a whole number from 2 to 3 and X is an inorganic or organic negative group relative to chromium.

5. The catalyst of claim 1 wherein said organic chromium compound comprises a pi-bonded chromium compound essentially of the structure $$(L)_x-Cr-(L')_y$$

wherein L and L' are the same or different organic ligands which are adapted to being pi-bonded to the chromium atom, and x and y are each integers of 0 to 3 inclusive, and x plus y equals 2 to 6, inclusive.

6. The catalyst of claim 1 wherein said organic chromium compound comprises a tetravalent organochromium compound essentially of the structure $Y_4Cr$ or $(YO)_4Cr$ wherein Y is selected individually from alkyl, alkenyl, cycloalkyl, cycloalkenyl, cycloalkyl-substituted alkyl, and aryl-substituted alkyl radicals containing 1 to about 14 carbon atoms.

7. The catalyst of claim 1 wherein said organic chromium compound comprises the reaction product of ammonium chromate and pinacol.

8. The catalyst of claim 1 wherein said chromium compound comprises a chromium carboxylate.

9. The catalyst of claim 8 wherein said chromium compound comprises chromium acetate.

10. The catalyst of claim 1 wherein (3) comprises reacting the product of (2) with a mixture of the alkyl esters of boron and titanium, or with a mixture of boric acid and an alkyl ester of titanium.

* * * * *